T. C. CHAPPELL & E. D. MOORE.

Said MOORE assignor to said CHAPPELL.

LETTER BOX.

No. 11,059. Reissued Feb. 11, 1890.

WITNESSES:

C. Raymond Weaver

R. F. Hook

INVENTOR

Everett D. Moore & Thomas C. Chappell

BY

Price & Stewart their ATTORNEYS

UNITED STATES PATENT OFFICE.

THOMAS C. CHAPPELL AND EVERETT D. MOORE, OF BALTIMORE, MARYLAND; SAID MOORE ASSIGNOR TO SAID CHAPPELL.

LETTER-BOX.

SPECIFICATION forming part of Reissued Letters Patent No. 11,059, dated February 11, 1890.

Original No. 407,870, dated July 30, 1889. Application for reissue filed January 17, 1890. Serial No. 337,269.

*To all whom it may concern:*

Be it known that we, THOMAS C. CHAPPELL and EVERETT D. MOORE, citizens of the United States, residing at Baltimore, in the State of Maryland, have invented certain new and useful Improvements in Mail-Parcel Boxes; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to improvements in the devices for the reception and the security of packages and large parcels of mail-matter, which may be placed in such public locations as will suit the convenience of the community, and can be used either in connection with or independent of the present street letter-boxes, and wherein such mail-matter that is too large to be placed in the said letter-boxes may be deposited with like security, the construction of the device being such that when the parcel is placed in the receptacle thereof it will be caused automatically to pass into a locked second compartment or receptacle, from whence it can be removed only by the person possessing the key to this second compartment.

In the further description of our invention reference is had to the accompanying drawings, in which—

Figure 1:
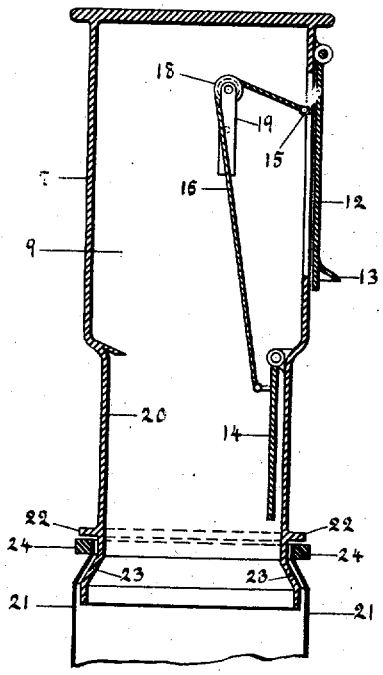
Figure 2:
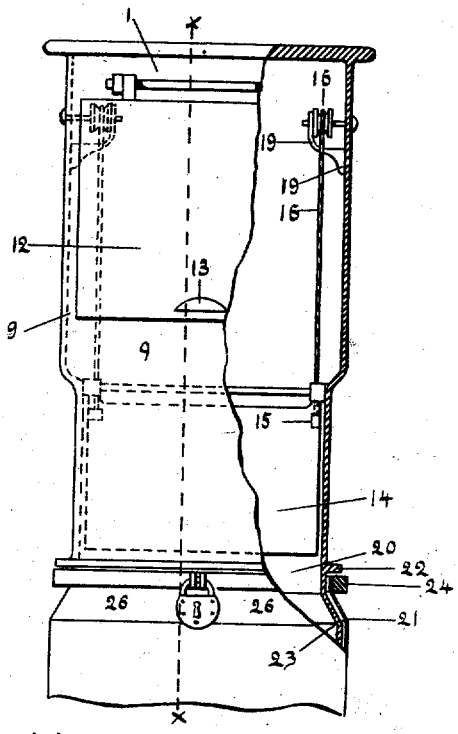
Figure 3:
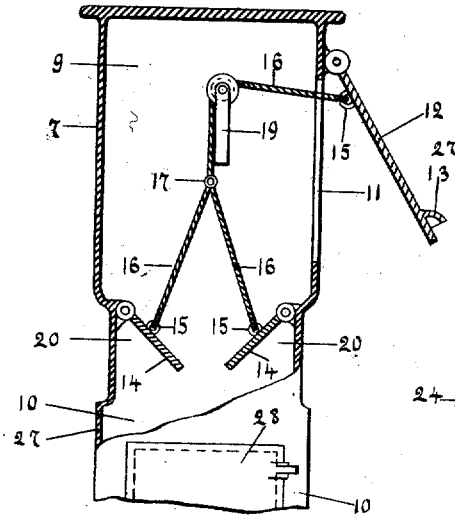
Figure 4:
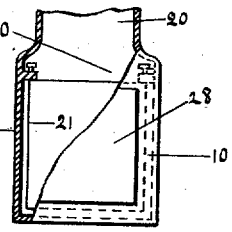
Figure 5:
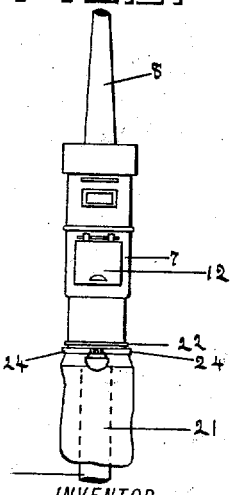
Figure 6:
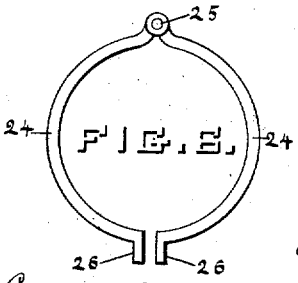

Figure 1 is a vertical section through X X, Fig. 2, of the box, showing part of sack attached thereto. Fig. 2 is a front elevation of the device with a part of front removed, showing part of sack attached thereto. Fig. 3 is a vertical section through the box, showing a modification of the locking device therein and a part of the box which forms the second or locked compartment thereof. Fig. 4 is a view of the locked compartments, showing a water-proof sack suspended therein. Fig. 5 is a front elevation of the device in full and a letter-box attached thereto. Fig. 6 is a detail view of the ring which forms the mouth of the sack when it is employed without the lower box.

The same figures refer to the same or similar parts throughout the several views.

The figure 7 denotes the casing or box, which is preferably constructed of cast-iron, and of such form that it may be conveniently secured to a post 8 or to a wall in a manner similar to that employed in the present letter-boxes, and is formed of two compartments, the upper or depositing compartment 9, into which the parcel for mailing is placed, and the lower locked storage-compartment 10, into which is automatically dropped the parcel, and wherein it is securely confined until released by a proper key to this storage-compartment, to accomplish which the said box 7 is provided with the following devices: One side of the upper compartment 9 is provided with an opening 11, of convenient size to receive the parcel, its dimensions being limited to such size as will permit the insertion therethrough of only such packages which will conveniently pass into the lower compartment.

Hinged to the box 7 is the door 12, which is caused to normally remain in the lower or closed position by gravity and protects the said opening 11, a handle 13 being placed in the door for convenience of opening.

In order to protect the entrance to the lower or locked storage-compartment 10, and to prevent the abstraction therefrom through the opening 11 of the deposited mail-matter, there are provided at the entrance to this compartment the trap-doors 14, Fig. 3; or one alone may be employed, as represented in Figs. 1 and 2, which are hinged on the inside of the box 7 at this point in such manner that they are free to fall by gravity and normally maintain the vertical or open position. At a proper radial distance from the hinged center of the said trap-doors 14 are provided the eye-bolts 15 or some suitable device, to which is secured the end of the wire rope 16, which is made in the branched form represented in Fig. 3, when two trap-doors 14 are employed, uniting into the single part 16 at 17. From thence this single part of the rope 16 passes over the pulleys 18, which are supported from the side of the box 7 by the brackets 19—one on each side of the box—the other ends of the said rope being made fast to a properly-located eyebolt 15, or some suitable device for this purpose, on the inside of the door 12, whereby the said door 12 and the trap-doors 14 will be caused to move in unison.

The lower compartment 10 may terminate in a chute, Figs. 1, 2, and 3, to which is locked the water-proof mail-sack 20, the said chute being provided on the side thereof with the flange 22, and its end terminating with the tapered swell 23, by which means the water-proof mail-sack 20 may be safely locked thereto by means of the hinged band 24, which forms the mouth of the said sack, the said band being formed of two parts, Fig. 6, and connected by the hinges 25, the free ends of the band 24 terminating in the lugs 26, by which the said band may be held in the closed position around the chute 20, where it will be secured in position to receive the deposited mail-matter by the flanges 22 and swelled end 23. In lieu of this band 24 a flexible wire rope may be employed for this purpose and the bag securely locked to the box thereof.

In Fig. 3 a box 27, of common form, is partly shown as a receptacle for the deposited parcels, a door 28 being provided for the convenient removal of the contents thereof.

In Fig. 4 a box 27 is represented, which has suspended therein a sack 21, the said sack being suspended from lugs or by some suitable device on the inside of the said box 27 in such position to receive the deposited parcel, the door 28 permitting the easy removal or insertion of the said sack in the box.

The manner of operating is as follows: As stated, the box is suspended in any convenient place where convenient access may be had to the door 12. When it is desired to deposit a package in the box, the said door 12 is raised by its handle 13, which movement will cause the trap-door 14 to move in unison therewith by means of the rope 16 and assume the horizontal or closed position, a slight movement of the door 12 causing a much greater radial movement to the trap-door 14 in consequence of the relative angles through which the power is applied through the said rope 16, whereby the slightest movement of the door 12 will cause the trap-door 14 to sufficiently obstruct the passage to the lower compartment 10 to prevent the abstraction therefrom of any matter. When the door 12 is opened sufficiently wide to admit a parcel, the said trap-doors 14 will form a floor upon which to place the said parcel. When the door 12 is released, gravity will cause it to fall and close the opening 11, and at the same time the trap-doors 14 will drop and permit the parcel to be deposited in the receptacle 21 therefor, as previously stated, the opening 11 being only of such dimensions as will permit the insertion therethrough of such a parcel as will readily fall through the opening into the lower storage-compartment, from where it is to be removed by the carrier by either releasing the sack 21 or opening the door 28.

Having thus described our invention and manner of operating, what we claim, and desire to secure by United States Letters Patent, is—

1. In a mail-parcel box, the combination of a casing provided with a receiving-opening 11, the bottom of said casing being open and terminating in the swelled end 23, the flange 22, encircling the said casing near the bottom thereof, a door 12, hinged to the casing to protect the opening 11 and constructed to swing outward, the inner door 14, hinged on the inside of the casing below the opening 11 therein and swinging downward, the rope 16, connecting the doors 12 and 14, whereby when the door 12 is opened the inner door 14 will be closed, and a mail-sack provided with the hinged band 24 around the mouth thereof for securing said sack to the lower open end of said casing, substantially as shown, and for the purpose set forth.

2. In a mail-parcel box, the combination of a casing provided with a receiving-opening and having an open bottom, the edge of which is provided with a laterally-extended flange encircling the casing, and a mail-sack provided with a hinged band around the mouth thereof, whereby the sack may be secured to the casing, substantially as described.

In testimony whereof we affix our signatures in presence of two witnesses.

THOMAS C. CHAPPELL.
EVERETT D. MOORE.

Witnesses:
WM. LEE STILES,
W. H. BUCK, Jr.